J. F. SCRIBNER.
BENDING TOOL.
APPLICATION FILED MAR. 19, 1917.
1,247,729.
Patented Nov. 27, 1917.
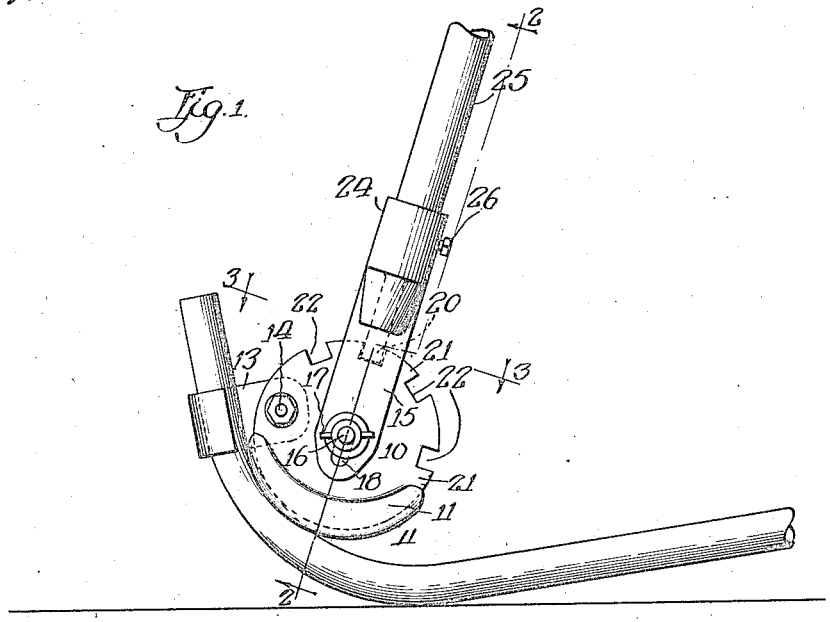
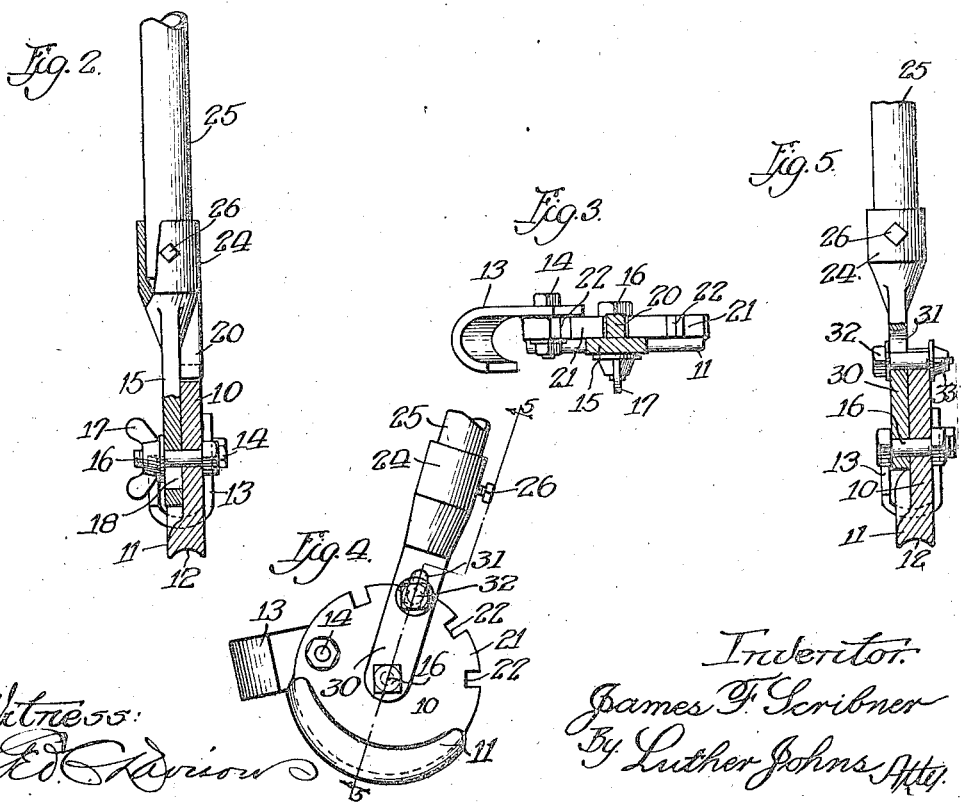

UNITED STATES PATENT OFFICE.

JAMES F. SCRIBNER, OF CHICAGO, ILLINOIS, ASSIGNOR TO UNIVERSAL HEADLIGHT COMPANY, OF CHICAGO, ILLINOIS, A CORPORATION OF ILLINOIS.

BENDING-TOOL.

1,247,729.   Specification of Letters Patent.   Patented Nov. 27, 1917.

Application filed March 19, 1917. Serial No. 155,709.

*To all whom it may concern:*

Be it known that I, JAMES F. SCRIBNER, a citizen of the United States, and a resident of the city of Chicago, in the county of Cook and State of Illinois, have invented certain new and useful Improvements in Bending-Tools, of which the following is a specification.

My invention relates to tools for bending pipes and the like. Its principal objects are to provide a strong and durable pipe or rod bending tool which is easily operable, of few parts, simple of construction, cheap in manufacture, and one which is highly efficient in operation. A particular object is to provide a hand-controlled bending tool capable of being used variously on the floor, in a vise or other holding means on the work bench, or for bending partially fixed pipes *in situ*, and one which is capable of ready adjustment whereby the handle may be positioned rigidly at various angles with respect to the direction of the article being bent. Other objects and advantages will appear hereinafter.

In the accompanying drawings, which form a part of this specification, Figure 1 is a face view of the preferred form of the device showing it in engagement with a pipe being bent upon the floor, Figs. 2 and 3 are sectional views on the lines 2—2 and 3—3 respectively of Fig. 1, viewed in the direction of the arrows; Fig. 4 is a face view of a modified form of the tool; and Fig. 5 is a medial longitudinal section of the device of Fig. 4, as on the line 5—5 thereof.

The forming member 10 is preferably substantially flat and substantially circular and is provided with an integral flange or extension 11 to accommodate the curved and preferably arcuate pipe engaging groove 12. Means for holding the pipe in engagement with the forming member and in the groove 12 comprise the hook or clutch element 13 pivotally secured upon the forming member by the bolt 14, the clutch member being open at one side whereby the device may be readily positioned upon a pipe to be bent and be as readily removed therefrom. A radially arranged lever 15 is secured substantially at the center of the disk-like former 10, as by the bolt 16, a wing nut 17 being adapted to tighten the lever 15 upon the former 10.

In the preferred construction (Figs. 1, 2 and 3) the lever 15 has a slot 18 accommodating the bolt 16 whereby the lever is movable inward or outward with respect to the center of the disk 10. A projection 20 integral with the lever 15 is substantially close to the peripheral portion of the former 10, and the former 10 is provided with a plurality of projections or stops 21 defining a plurality of recesses 22 arranged bodily in arcuate form, the center of the arc being at the bolt 16. The arrangement is such that when the wing nut 17 is slightly retracted, where the parts are as in Fig. 1, the lever 14 may be moved in its longitudinal direction outward whereby the projection or dog 20 comes out of the recess 22 in which it is positioned, and thereupon the lever 15 may be rocked into another radial position upon the bolt 16 as a pivot, whereupon, by moving the lever 15 longitudinally inward it will become locked with and upon the former 10 in any one of the recesses 22 opposite which the projection 20 may have been placed. The wing nut 16 thereupon being tightened the device is again ready for use with the lever extending in another radial direction.

The hollow enlargement of the lever 15, as at 24, is provided so that a handle 25, ordinarily consisting of a piece of pipe, may be inserted therein, the set screw 26 holding the handle rigidly in place.

It is highly desirable in a tool of this kind that the operating lever and handle be in rigid engagement with the forming member during the application of the tool to the work as well as in the bending operation, and it is important also that the direction of the handle be readily adjustable into various angular relations with the work according to the degree of bend desired or the particular location of the rod or pipe to be bent. The strain upon such a tool during the bending operation is quite great and the coöperating interlocking means between the operating lever and the former must be quite strong. The projections or stops 21 are therefore of quite material width in a circumferential direction, and the dog 21 is also of material thickness. When the parts are interlocked, as in Fig. 1, the operator can control the instrument perfectly, the former 10 and lever 15 being rigidly locked together. Thus, in applying the instrument to the work and in advancing it or retracting it along the pipe as occasion may require the operator can roll the device upon the pipe to release partially the clutching member 13, shift the entire tool to new position and at once repeat the bending operation as may be desired. In changing the direction of the handle 25 it is only necessary to retract the wing nut 17 with one hand, draw outward upon the handle and insert the dog 20 in another of the recesses 22 and again tighten the nut 17, the instrument being under easy control at all times.

In the modified structure of Figs. 4 and 5, the lever 30 has a slot 31 near the periphery of the former 10 and a locking bolt 32 with wing nut 33 is slidable in this slot. By moving the bolt 32 outward in the longitudinal direction of the handle in the slot 31 the bolt is disengaged from one of the recesses 22 and the lever is thereupon free to be shifted into another radial position. After being so shifted and the bolt 32 positioned in one of the recesses 22 a tightening of the wing nut again locks the parts rigidly together.

The forming member 10 may be made of ordinary gray cast iron, while for purposes of strength the lever 15 is preferably made of malleable iron. The clutch member 13 is preferably of rolled wrought iron.

While I have illustrated and described a preferred and a modified construction, the invention is not limited to the exact details or arrangement shown. Reference should be had to the appended claims to determine what I consider within the scope of these improvements.

I claim:

1. In a pipe bending tool, the combination of a forming member, means for holding a pipe in engagement therewith, a lever mounted to rock and also to move in its longitudinal directions on said forming member, coöperating interlocking means on the lever and forming member for locking the forming member and lever rigidly together, said coöperating means being in such relation to each other that by moving said lever in one of its longitudinal directions the lever and forming member are locked together, and means for holding the forming member and lever in locked relation to each other.

2. In a pipe bending tool, the combination of a substantially flat and circular forming member having a groove on one edge portion thereof and a plurality of projections and intervening recesses substantially radially arranged on substantially the opposite edge portion thereof, means for holding a pipe in engagement with said groove, a lever substantially radially held upon the forming member, the lever being mounted to rock into various radial positions, locking means carried by the lever and mounted to move in the longitudinal directions of the lever, said locking means being adapted to interlock with said projections when said locking means are moved inward toward the center of the forming member, and means for securing said locking means in relatively fixed relation with the forming member whereby the forming member and the lever are rigidly locked together.

3. In a pipe bending tool, the combination of a forming member having a curved groove in an edge portion thereof and a plurality of recesses in substantially arcuate bodily arrangement in another edge portion thereof, means for holding a pipe in engagement with said groove, holding means positioned substantially at the center of curvature of the arc of said recesses for holding an operating lever, an operating lever mounted for in and out substantially radial movement and also to rock into various radial positions on said last mentioned holding means, a rigid projection carried by said lever and adapted to engage any of said recesses and thereby lock said lever rigidly to said forming member when the lever is moved radially inward, and means associated with said holding means for releasably maintaining said lever against retraction from its locking relation to said forming member.

JAMES F. SCRIBNER.